United States Patent [19]

Shiraishi et al.

[11] 4,010,238
[45] Mar. 1, 1977

[54] PROCES FOR SELECTIVE REMOVAL OF NITROGEN OXIDES FROM WASTE GASES

[75] Inventors: Tatsuo Shiraishi; Shinkichi Shimizu; Hiroshi Ichihashi; Tadashi Shindo, all of Niihama, Japan

[73] Assignee: Sumitomo Chemical Company, Limited, Japan

[22] Filed: Mar. 19, 1974

[21] Appl. No.: 452,659

[30] Foreign Application Priority Data

Mar. 26, 1973 Japan .............................. 48-34895

[52] U.S. Cl. .............................. 423/239; 252/437; 252/461; 252/467; 252/472; 252/475; 252/476; 423/351

[51] Int. Cl.² ....................... B01J 8/00; C01B 21/00

[58] Field of Search ............... 423/239, 213.2, 219, 423/351; 252/462, 464, 437, 461, 467, 472, 475, 476

[56] References Cited

UNITED STATES PATENTS

| | | | |
|---|---|---|---|
| 3,249,558 | 5/1966 | Kearby | 423/213.2 |
| 3,279,884 | 10/1966 | Nonnenmacher | 423/239 |
| 3,476,508 | 11/1969 | Kearby et al. | 423/239 |
| 3,513,109 | 5/1970 | Stiles | 423/213.2 |
| 3,615,166 | 10/1971 | Hindin et al. | 423/239 |
| 3,840,471 | 10/1974 | Acres | 423/239 |

FOREIGN PATENTS OR APPLICATIONS 662,460  5/1951  United Kingdom ............ 423/213.2

*Primary Examiner*—Oscar R. Vertiz
*Assistant Examiner*—Eugene T. Wheelock
*Attorney, Agent, or Firm*—Stewart and Kolasch, Ltd.

[57] ABSTRACT

A process for the selective removal of nitrogen oxides from waste gases containing nitrogen oxides, which comprises contacting the waste gases with a metal oxide catalyst having the following formula:

$$V_x A_y O_z$$

wherein V is vanadium; A is at least one element selected from the group consisting of copper, zinc, tin, lead, titanium, phosphorus, chromium, iron, cobalt and nickel; $x$ and $y$ are each a numeral of 0.5 to 12; and $z$ is a numeral of 1 to 60, at a temperature of 150° to 800° C in the presence of ammonia.

13 Claims, No Drawings

PROCES FOR SELECTIVE REMOVAL OF NITROGEN OXIDES FROM WASTE GASES

The present invention relates to a process for the selective removal of nitrogen oxides from waste gases exhausted from a boiler, heating furnace or internal combustion engine or in a step for the treatment of metals with nitric acid. More particularly, it relates to a process for the selective removal of nitrogen oxides from waste gases containing nitrogen oxides which comprises contacting the waste gases with a metal oxide catalyst having the formula:

$$V_xA_yO_z$$

wherein V is vanadium, A is at least one element selected from the group consisting of copper, zinc, tin, lead, titanium, phosphorus, chromium, iron, cobalt and nickel, $x$ and $y$ are each a numeral of 0.5 to 12, and $z$ is a numeral of 1 to 60, in the presence of ammonia, and thereby the nitrogen oxides are catalytically reduced to nitrogen gas which is harmless to the human body.

Nitrogen oxides include various compounds, such as nitrogen monoxide, nitrogen dioxide, dinitrogen trioxide, dinitrogen monoxide, dinitrogen pentaoxide or the like. Among them, nitrogen monoxide and nitrogen dioxide are the most harmful to the human body, and the others are usually included in a very small amount and may be negligible from the viewpoint of air pollution. Usually, the so-called "nitrogen oxides" means a mixture of nitrogen monoxide and nitrogen dioxide.

It has been recently made clear that nitrogen oxides are not only physiologically harmful to the human body but also cause photochemical smog (smoke-fog) which gives a social problem from the viewpoint of air pollution.

It is said that nitrogen monoxide may be readily converted into nitrogen dioxide in the atmosphere, and the nitrogen dioxide is decomposed to nitrogen monoxide and atomic oxygen by sun light, and the atomic oxygen acts on molecular oxygen and hydrocarbons which is one of the air pollutants in air to give ozone and aldehydes, respectively, which cause the photochemical smog.

Nitrogen oxides are mostly produced by chemical reaction of nitrogen and oxygen in the step of combustion at a high temperature in a boiler or internal combustion engine, and are also produced by decomposition of nitric acid in the step of treatment of metals with nitric acid.

The photochemical smog usually occurs in a specific area, such as a city wherein many automobiles, factories or power stations are crowded together. These automobiles, factories and power stations will number even more in the future, and therefore, the waste gases exhausted therefrom and the amount of nitrogen oxides included therein will also increase.

There have, hitherto, been considered various countermeasures against sulfur dioxide, hydrocarbons and carbon monoxide among the air pollutants, but the countermeasure against nitrogen oxides has not satisfactorily progressed.

One of the conventional countermeasures against nitrogen oxides is to decrease the occurrence of nitrogen oxides per se. That is, by improving the manner of combustion in a boiler or internal combustion engine, the combustion is carried out at a lower temperature and thereby the production of nitrogen oxides from nitrogen and oxygen is inhibited. According to this method, the production of nitrogen oxides may be somewhat decreased, but the concentration of nitrogen oxides in the waste gases is still so high as 300 to 1,000 ppm and cannot be further decreased.

It has further been studied to remove the nitrogen oxides by absorption. However, such method is not effective (the absorption efficiency being low) and requires a large scale of apparatus in case of waste gases having low concentrations of nitrogen oxides and much gas stream volume, and further, the nitrogen oxides thus absorbed must be treated. Accordingly, this method is not suitable from the technical and economical viewpoints.

For overcoming such defects in these known methods, there has been known the removal of nitrogen oxides by a catalytic reduction thereof, which comprises adding a reducing gas, such as a hydrocarbon, carbon monoxide, hydrogen or ammonia to the waste gases containing nitrogen oxides and then contacting the mixture with a catalyst.

However, when a hydrocarbon, carbon monoxide or hydrogen is used as the reducing gas, the gas first reacts with the oxygen which is contained in a large amount in the waste gases before it reacts with the nitrogen oxides, and after all of the oxygen is completely consumed, the reducing gas reacts with the nitrogen oxides. The waste gases exhausted from a boiler or internal combustion engine include usually 2 to 4% by mol of oxygen which is 20 to 400 times of that of nitrogen oxides. Accordingly, a great excess amount of the reducing gas is required for effectuating the above method. Furthermore, the combustion of such a large amount of waste gases results in a large exotherm which induces the raising of the temperature of the catalyst bed to a temperature as high as 400° to 500° C, and therefore, the control of the temperature is difficult and further the catalyst life is badly affected. Various catalysts have been tried in this method, but the practical catalyst is merely a noble metal catalyst comprising platinum or palladium.

On the other hand, when ammonia is used as the reducing gas, it is effective in only a small amount as one to three times of the stoichiometric amount required for the reduction of nitrogen oxides to nitrogen gas, because it can easily reduce nitrogen oxides but hardly reacts with oxygen, and the raising of the temperature of the catalyst bed can be neglected. Furthermore, the supplied ammonia can completely react with the nitrogen oxides and oxygen included in the waste gases and converts them into nitrogen gas and water, respectively, and the amount of the exhausted ammonia is negligibly small.

As the catalysts used for this method, there have been known a catalyst of a noble metal such as platinum or palladium (U.S. Pat. No. 3,328,115) and further a catalyst of a metal oxide, such as iron oxide-chromium oxide (West German Pat. No. 1,253,685), and copper oxide, copper oxide-chromium oxide, molybdenum oxide or vanadium oxide-molybdenum oxide (U.S. Pat. No. 3,279,884 and West German Pat. No. 1,253,685). The platinum or palladium catalyst is very expensive and further has various disadvantages that it is unsuitable for use against a waste gas containing sulfur compounds, particularly sulfur dioxide since it is readily attacked by the sulfur compound; ammonia is oxidized to nitrogen oxides by oxygen included in the waste gas at a high temperature which results in an increase of the nitrogen oxides.

The concentration of nitrogen oxides contained in waste gases exhausted from a boiler and internal combustion engine may be usually in a range of 100 to 1,500 ppm and the concentration of the oxygen present therewith is 2 to 4% by mol. When the waste gas containing nitrogen oxides in a high concentration of about 5,000 ppm (0.5% by mol) is treated by ammonia on a catalyst, the ammonia reacts previously with the nitrogen oxides and the reaction with oxygen is negligible, and therefore the removal of nitrogen oxides is achieved in a high conversion rate (removal rate). On the contrary, when the waste gas contains a low concentration of nitrogen oxides, such as 100 to 1,500 ppm, there results an increase of the ratio of the ammonia which reacts with the oxygen which is present in a concentration of 20 to 400 times of that of the nitrogen oxides, and as the result, the reaction with the nitrogen oxides is inhibited and the conversion rate of nitrogen oxides to nitrogen gas is very low.

Under the circumstances, it has been studied to find an improved process for the selective removal of nitrogen oxides from waste gases, and it has now been found that the nitrogen oxides can be removed in a high rate from waste gases containing nitrogen oxides not only in a high concentration but also in a low concentration such as a waste gas exhausted from a boiler or internal combustion engine by using a specific catalyst. That is, the present inventors have found that by using a metal oxide catalyst having the formula:

$$V_xA_yO_z$$

wherein V is vanadium; A is at least one element selected from the group consisting of copper, zinc, tin, lead, titanium, phophorus, chromium, iron, cobalt and nickel; $x$ and $y$ are each a numeral of 0.5 to 12; and $z$ is determined depending on the number of the other elements and generally is a numeral of 1 to 60, the nitrogen oxides in waste gases can be readily removed in an extremely higher conversion rate in comparison with the known catalyst, such as a vanadium oxide catalyst, a copper oxide catalyst, a copper oxide-chromium oxide catalyst or an iron oxide-chromium oxide catalyst, and further the high catalyst activity can be maintained even in case of the presence of sulfur dioxide in the waste gases.

The present invention provides a process for the selective removal of nitrogen oxides from waste gases containing nitrogen oxides which comprises contacting the waste gases with a metal oxide catalyst having the formula: $V_xA_yO_z$ wherein V, A, $x$, $y$ and $z$ are as defined above, in the presence of ammonia at a temperature of 150° to 800° C.

From the viewpoint of the prevention of air pollution, the most important check-point is the amount of nitrogen oxides exhausted from the preventing device, and in the present invention, the non-conversion rate of nitrogen oxides is used an an indicator for measuring the amount of nitrogen oxides exhausted from the device.

According to the present invention, the nitrogen oxides can completely be removed from the waste gases, and the amount of nitrogen oxides released from the reactor, i.e., the non-conversion rate of nitrogen oxides can be made about one third or less of that in case of using the known catalyst, such as a vanadium oxide catalyst, a copper oxide catalyst, a copper oxide-chromium oxide catalyst or an iron oxide-chromium oxide catalyst.

In the present catalyst, the ratio of $x$ which means the atomic number of vanadium and $y$ which means the atomic number of one or more elements selected from copper, zinc, tin, lead, titanium, phosphorus, chromium, iron, cobalt and nickel may be preferably in a range of 11 : 1 to 3 : 9, more preferably, 10 : 2 to 4 : 8. When the ratio of vanadium is over 12 : 0.5, the temperature for obtaining the maximum conversion rate of nitrogen oxides moves to a lower temperature and further the conversion rate per se is also lowered. On the other hand, when the ratio of vanadium is less than 0.5 : 12, the temperature for obtaining the maximum conversion rate of nitrogen oxides moves largely to a higher temperature and the conversion rate per se is largely lowered. As the component A, copper, tin, chromium and iron are particularly preferable species.

The exact state of the components in the catalyst has not been ascertained, but it may contain vanadium being penta-, tetra- or trivalent, copper being di- or monovalent, zinc being divalent, tin or lead being tetra- or divalent, titanium being tetravalent, phosphorus being pentavalent, chromium being hexa, penta- or trivalent, and/or iron, cobalt or nickel being tri- or divalent, which are in the form of oxides or complex oxides thereof.

The catalyst may be composed of the catalyst components alone, i.e., without using any carrier, which may be in the form of a granule, tablet or extrusion molded product. It may be, however, preferable for the catalyst to be supported on conventional carriers for the purpose of increase of the mechanical strength and the homogeneity of the catalyst components. The conventional catalyst carriers may be activated alumina, α-alumina, silica gel, alumino-silicate, diatomaceous earth, silicon carbide, titanium oxide or the like. The carriers may be used in the form of a granule, tablet or extrusion-molded product or in the form of a sol. When it is in the form of a sol, it may be admixed with the catalyst components and then formed to the desired forms.

The starting material of vanadium for the present catalyst may be vanadium oxides (e.g., divanadium pentaoxide, divanadium tetraoxide or divanadium trioxide), vanadium complexes (e.g., vanadyl oxalate, vanadyl chloride or a chelate compound with an organic amine) or salts (e.g., ammonium metavanadate). The starting material of copper, zinc, lead, chromium, iron, cobalt and nickel may be an oxide, vanadate, nitrate, chloride, carbonate, acetate, hydroxide, or complex salt thereof. Chromium may be also in the form of a chromic acid salt (e.g., chromic anhydride or ammonium chromate). The starting material of tin and titanium may be tin oxide, tin tetrachloride, tin dichloride, or titanium tetrachloride. The starting material of phosphorus may be phosphoric acid, ammonium phosphate or phosphorus pentaoxide.

The most preferred starting materials may be water soluble salts for the purpose of mixing homogeneously the catalyst components. Various ethanolamines, amines and oxalic acid may be used for forming complex compounds of the vanadium and thereby increasing the solubility thereof. When a catalyst is prepared by penetrating the catalyst component into a formed catalyst carrier, the water soluble starting materials are the most preferable.

The catalyst used in the present invention may be prepared, for example, by mixing a solution of ammonium metavanadate in water containing monoethanolamine with a solution of a nitrate of copper, zinc, lead, iron, cobalt or nickel; chromic anhydride; titanium tetrachloride; or phosphoric acid in water so as to give a fixed atomic ratio of each metal, and penetrating the resulting mixture into an activated alumina being in granule or tablet form, and then drying the penetrated product. The drying may be carried out at 60° to 250° C until it becomes substantially anhydrous. After drying, the catalyst may be calcined at 300° to 800° C, preferably 350° to 600° C for 4 to 10 hours.

When the present catalyst is used for the removal of nitrogen oxides from waste gases exhausted from a boiler, internal combustion engine or the like, it may be generally charged into a reactor in the form of a fixed bed or fluidized bed.

The reaction temperature suitable for the present selective removal of nitrogen oxides may vary depending upon the components of the catalyst, components of the gases to be treated and the space velocity of the gases to be treated, but may be usually in a range of 150° to 800° C, preferably 200° to 400° C. When the reaction temperature is lower than 150° C, the reaction between the ammonia and nitrogen oxides barely proceeds. On the other hand, when it is higher than 800° C, the ammonia is consumed by the reaction with oxygen to result in lowering of the conversion rate of nitrogen oxides.

The amount of ammonia to be supplied to the reaction may be 0.3 to 4 mol, preferably 0.7 to 3 mol to 1 mol of nitrogen oxides (i.e., a mixture of nitrogen dioxide and nitrogen monoxide). When the amount of ammonia is less than the above range, a high conversion rate of nitrogen oxides cannot be expected even from the viewpoint of stoichiometry. When the gases to be treated contain oxygen, ammonia may be preferably used in an excess amount over the stoichiometric amount required for reducing the nitrogen oxides to nitrogen gas. However, the use of ammonia in too great of an amount more than 4 mol (to 1 mol of nitrogen oxides) induces the high concentration of unreacted ammonia at the outlet of the reactor which may cause subsidiary air pollution and further is not preferable from the economic viewpoint.

The ammonia may be used in various forms, such as gaseous ammonia, aqueous ammonia or an aqueous solution of an ammonium salt (e.g., ammonium carbonate) which can be easily hydrolyzed to ammonia at the reaction temperature.

The gases to be treated may be preferably contacted with the catalyst at a space velocity of 2,000 to 100,000 hr$^{-1}$, more preferably 6,000 to 30,000 hr$^{-1}$. When the space velocity is less than 2,000 hr$^{-1}$, too large of a reactor and too much volume of catalyst must be used, while a high conversion rate of nitrogen oxides may be achieved, and on the other hand, when it is over 100,000 hr$^{-1}$, the conversion rate of the nitrogen oxides is lowered.

The present invention is illustrated by the following Examples but is not limited thereto.

In the Examples, the conversion rate of ammonia (NH$_3$), the conversion rate (removal rate) of nitrogen oxides (NO$_x$: $x$ is 1 or 2), the non-conversion rate of nitrogen monoxide (NO) and the non-conversion rate of nitrogen dioxide (NO$_2$) are calculated by the following equations:

Conversion rate of ammonia (%)

$$= \frac{\text{Number of moles of reacted ammonia}}{\text{Number of moles of supplied ammonia}} \times 100$$

Conversion rate of nitrogen oxides (%)

$$= \frac{\text{Number of moles of removed nitrogen oxides}}{\text{Number of moles of contained nitrogen oxides}} \times 100$$

Non-conversion rate of nitrogen monoxide (%)

$$= \frac{\text{Number of moles of nitrogen monoxide released from the outlet of reactor}}{\text{Number of moles of contained nitrogen monoxide}} \times 100$$

Non-conversion rate of nitrogen dioxide (%)

$$= \frac{\text{Number of moles of nitrogen dioxide released from the outlet of reactor}}{\text{Number of moles of contained nitrogen dioxide}} \times 100$$

EXAMPLE 1

Monoethanolamine (36 ml) is dissolved in water (330 ml) and thereto is added ammonium metavanadate (21.06 g), and the mixture is agitated to give a solution. The solution is mixed with a solution of chromic anhydride (6.00 g) in water (60 ml).

To the mixed solution is added activated alumina (122.4 g) and then the mixture is evaporated at 80° C to remove moisture. After the mixed solution is completely penetrated into the activated alumina carrier, it is dried at 200° C until it becomes anhydrous.

The catalyst thus obtained is charged into a furnace, and the temperature of the furnace is raised from room temperature to 400° C over a period of 2 hours. The furnace is kept at this temperature for 5 hours, and is then allowed to cool to room temperature. The catalyst thus calcined has the atomic ratio of vanadium, chromium and oxygan: V$_9$Cr$_3$O$_{27}$.

The catalyst (5 ml) is introduced into a glass-made reaction tube having 12 mm in inside diameter. To the reaction tube is passed through a gas mixture containing waste gas and the equivolume of oxygen and steam, i.e., comprising 86.3% by mol of nitrogen, 2.6% by mol of oxygen, 11.1% by mol of steam, 275 ppm of nitrogen monoxide and 594 ppm of ammonia at a space velocity of 13,500 hr$^{-1}$ and at 250° C. The conversion rate of ammonia is 89.5% and the conversion rate of nitrogen oxide is 96.1%, i.e., the non-conversion rate of nitrogen monoxide is 3.9%.

At the reaction temperature of 300° C, the conversion rate of ammonia is 98.1% and the conversion rate of nitrogen oxide is 100%, which means that the nitrogen oxide is completely removed. Besides, at the reaction temperature of 350° C, the conversion rate of ammonia is 98.5% and the conversion rate of nitrogen oxide is 99.4%, i.e. the non-conversion rate of nitrogen monoxide is 0.6%.

EXAMPLES 2 to 16

Fifteen kinds of catalysts are prepared in a similar manner as described in Example 1, wherein the starting vanadium and chromium are used in the same manner as in Example 1; copper, iron, nickel, cobalt, lead, and zinc are used as a solution of nitrate in water; tin and titanium are used as a solution of tetrachloride thereof in an aqueous hydrochloric acid solution; and phosphorus is used as phosphoric acid.

The catalysts are reacted with a gas mixture in the same manner as in Example 1. The results are shown in Table 1.

the nitrogen oxides component, i.e., comprising 86.4% by mol of nitrogen, 2.6% by mol of oxygen, 10.9% by mol of steam, 332 ppm of nitrogen monoxide, 79 ppm Table 1

| Ex. No. | Component of catalyst | Component of gas mixture | | | | | Total nitrogen oxides ppm | $NH_3$ ppm | Space velocity $hr^{-1}$ | Reaction temperature °C | Conversion rate of ammonia % | Conversion rate of nitrogen oxides % | Non-conversion rate of nitrogen monoxide % | Non-conversion rate of nitrogen dioxide % |
|---|---|---|---|---|---|---|---|---|---|---|---|---|---|---|
| | | $N_2$ % | $O_2$ % | $H_2O$ % | NO ppm | $NO_2$ ppm | | | | | | | | |
| 2 | $V_6Cr_6O_{18}$ | 86.2 | 2.6 | 11.1 | 275 | 0 | 275 | 594 | 13,500 | 250 | 100 | 90.2 | 9.8 | 0 |
| | | | | | | | | | | 300 | 96.0 | 97.3 | 2.7 | 0 |
| | | | | | | | | | | 350 | 100 | 97.4 | 2.6 | 0 |
| 3 | $V_9Cu_3O_{25.5}$ | 86.7 | 2.6 | 10.6 | 340 | 0 | 340 | 448 | 13,400 | 350 | 98.7 | 100 | 0 | 0 |
| 4 | $V_6Cu_6O_{21}$ | 86.7 | 2.6 | 10.6 | 340 | 0 | 340 | 448 | 13,400 | 350 | 90.0 | 98.3 | 1.7 | 0 |
| 5 | $V_9Fe_3O_{27}$ | 86.0 | 2.6 | 11.3 | 274 | 0 | 274 | 590 | 13,500 | 300 | 77.5 | 97.3 | 2.7 | 0 |
| | | | | | | | | | | 350 | 100 | 99.5 | 0.5 | 0 |
| 6 | $V_9Ni_3O_{25.5}$ | 86.1 | 2.6 | 11.2 | 321 | 0 | 321 | 460 | 13,500 | 350 | 85.2 | 98.1 | 1.9 | 0 |
| 7 | $V_9Co_3O_{25.5}$ | 86.1 | 2.6 | 11.2 | 321 | 0 | 321 | 460 | 13,500 | 350 | 82.6 | 94.2 | 5.8 | 0 |
| 8 | $V_9Pb_3O_{25.5}$ | 86.1 | 2.6 | 11.2 | 322 | 0 | 322 | 496 | 13,500 | 350 | 86.5 | 96.1 | 3.9 | 0 |
| 9 | $V_9Sn_3O_{28.5}$ | 86.1 | 2.6 | 11.2 | 322 | 0 | 322 | 496 | 13,500 | 250 | 96.4 | 89.3 | 10.7 | 0 |
| | | | | | | | | | | 300 | 97.0 | 97.1 | 2.9 | 0 |
| | | | | | | | | | | 350 | 98.7 | 99.5 | 0.5 | 0 |
| 10 | $V_9Zn_3O_{25.5}$ | 86.0 | 2.6 | 11.4 | 223 | 0 | 223 | 470 | 13,500 | 350 | 78.0 | 96.0 | 4.0 | 0 |
| | | | | | | | | | | 400 | 83.7 | 100 | 0 | 0 |
| 11 | $V_9P_3O_{30}$ | 86.1 | 2.6 | 11.2 | 362 | 0 | 362 | 649 | 13,500 | 350 | 77.6 | 97.8 | 2.2 | 0 |
| | | | | | | | | | | 400 | 82.2 | 99.3 | 0.7 | 0 |
| 12 | $V_9Ti_3O_{28.5}$ | 85.5 | 2.6 | 11.7 | 370 | 0 | 370 | 528 | 13,600 | 350 | 98.3 | 98.5 | 1.5 | 0 |
| 13 | $V_7Fe_2Cr_2O_{25}$ | 86.2 | 2.6 | 11.1 | 281 | 0 | 281 | 455 | 13,500 | 300 | 99.4 | 97.2 | 2.8 | 0 |
| 14 | $V_8Sn_2Fe_2O_{27}$ | 86.0 | 2.6 | 11.3 | 264 | 0 | 264 | 442 | 13,600 | 350 | 97.3 | 96.1 | 3.9 | 0 |
| 15 | $V_8Sn_2Cu_2O_{26}$ | 86.2 | 2.6 | 11.1 | 281 | 0 | 281 | 455 | 13,500 | 300 | 100 | 96.8 | 3.2 | 0 |
| 16 | $V_6Cr_3P_1O_{27}$ | 86.4 | 2.6 | 10.9 | 332 | 0 | 332 | 421 | 13,600 | 350 | 95.0 | 95.6 | 4.4 | 0 |

EXAMPLE 17

Onto the catalyst having the component: $V_9Cr_3O_{27}$ as used in Example 1 is passed through a gas mixture comprising 85.7% by mol of nitrogen, 2.6% by mol of oxygen, 11.7% by mol of steam, 1,242 ppm of nitrogen monoxide and 2,223 ppm of ammonia at a space velocity of 13,600 $hr^{-1}$ and at 350° C. The conversion rate of ammonia is 100% and the conversion rate of nitrogen oxide is 98.0%, i.e. the non-conversion rate of nitrogen monoxide if 2.0%.

EXAMPLES 18 to 20

In the same manner as in Example 17, a gas mixture containing 1,000 ppm or more of nitrogen monoxide is treated with the catalysts having the component: $V_9Cu_3O_{25.5}$ as used in Example 3, $V_9Fe_3O_{27}$ as used in Example 5 or $V_9Sn_3O_{28.5}$ as used in Example 9. The results are shown in Table 2.

of nitrogen dioxide (total nitrogen oxides: 411 ppm) and 575 ppm of ammonia at a space velocity of 13,500 $hr^{-1}$ and at 250° C. The conversion rate of ammonia is 77.8%, the conversion rate of nitrogen oxides is 92.1%, the non-conversion rate of nitrogen monoxide is 7.5% and the non-conversion rate of nitrogen dioxide is 0.4%.

At the reaction temperature of 300° C, the conversion rate of ammonia is 92.3%, the conversion rate of nitrogen oxides is 98.3%, the non-conversion rate of nitrogen monoxide is 1.4% and the non-conversion rate of nitrogen dioxide is 0.3%. Besides, at the reaction temperature of 350° C, the conversion rate of ammonia is 92.3%, the conversion rate of nitrogen oxides is 99.8%, the non-conversion rate of nitrogen monoxide is 0.0% and non-conversion rate of nitrogen dioxide is 0.2%.

EXAMPLES 22 to 26

Table 2

| Ex. No. | Component of catalyst | Component of gas mixture | | | | | Total nitrogen oxides ppm | $NH_3$ ppm | Space velocity $hr^{-1}$ | Reaction temperature °C | Conversion rate of ammonia % | Conversion rate of nitrogen oxides % | Non-conversion rate of nitrogen monoxide % | Non-conversion rate of nitrogen dioxide % |
|---|---|---|---|---|---|---|---|---|---|---|---|---|---|---|
| | | $N_2$ % | $O_2$ % | $H_2O$ % | NO ppm | $NO_2$ ppm | | | | | | | | |
| 18 | $V_6Cu_6O_{21}$ | 86.5 | 2.5 | 10.7 | 1,251 | 0 | 1,251 | 1,740 | 13,500 | 350 | 92.3 | 98.7 | 1.3 | 0 |
| 19 | $V_9Fe_3O_{27}$ | 86.4 | 2.6 | 10.9 | 1,253 | 0 | 1,253 | 2,090 | 13,500 | 350 | 100 | 98.0 | 2.0 | 0 |
| 20 | $V_9Sn_3O_{28.5}$ | 86.5 | 2.5 | 10.7 | 1,251 | 0 | 1,251 | 1,740 | 13,500 | 350 | 99.1 | 99.8 | 0.2 | 0 |

EXAMPLE 21

Onto the catalyst having the component: $V_9Fe_3O_{27}$ as used in Example 5 is passed through a gas mixture containing nitrogen monoxide and nitrogen dioxide as In the same manner as in Example 21, a gas mixture containing nitrogen monoxide and nitrogen dioxide is treated by using the catalyst having the component: $V_9Cr_3O_{27}$ as used in Example 1, $V_6Cr_6O_{24}$ as used in Example 2 or $V_9Sn_3O_{28.5}$ as used in Example 9. The results are shown in Table 3.

Table 3

| Ex. No. | Component of catalyst | Component of gas mixture | | | | | | Space velocity hr$^{-1}$ | Reaction temperature °C | conversion rate of ammonia % | Conversion rate of nitrogen oxides % | Non-conversion rate of nitrogen monoxide % | Non-conversion rate of nitrogen dioxide % |
|---|---|---|---|---|---|---|---|---|---|---|---|---|---|
| | | N$_2$ % | O$_2$ % | H$_2$O % | NO ppm | NO$_2$ ppm | Total nitrogen oxides ppm | NH$_3$ ppm | | | | | | |
| 22 | V$_9$Cr$_3$O$_{27}$ | 85.6 | 2.6 | 11.8 | 329 | 78 | 407 | 550 | 13,600 | 350 | 78.1 | 98.3 | 1.3 | 0.4 |
| 23 | V$_9$Cr$_3$O$_{27}$ | 85.8 | 2.6 | 11.5 | 346 | 41 | 387 | 472 | 27,200 | 350 | 89.4 | 93.6 | 5.2 | 1.2 |
| 24 | V$_6$Cr$_6$O$_{24}$ | 85.6 | 2.6 | 11.8 | 329 | 78 | 407 | 550 | 13,600 | 250 | 92.5 | 89.2 | 6.2 | 4.6 |
| | | | | | | | | | | 300 | 94.7 | 93.8 | 4.9 | 1.3 |
| | | | | | | | | | | 350 | 99.5 | 93.8 | 3.1 | 3.1 |
| 25 | V$_9$Sn$_3$O$_{28.5}$ | 86.4 | 2.6 | 10.9 | 332 | 79 | 411 | 575 | 13,500 | 250 | 80.9 | 89.6 | 9.1 | 1.3 |
| | | | | | | | | | | 300 | 96.2 | 97.4 | 2.6 | 0 |
| | | | | | | | | | | 350 | 99.0 | 99.3 | 0.7 | 0 |
| 26 | V$_9$Sn$_3$O$_{28.5}$ | 86.4 | 2.6 | 10.9 | 294 | 58 | 352 | 455 | 27,000 | 350 | 82.6 | 94.8 | 4.1 | 1.1 |

EXAMPLE 27

Onto the catalyst having the component: V$_6$Cr$_6$O$_{28.5}$ as used in Example 2 is passed through a gas mixture containing only nitrogen dioxide as the nitrogen oxides component, i.e., comprising 85.4% by mol of nitrogen, 2.6% by mol of oxygen, 12.0% by mol of steam, 209 ppm of nitrogen dioxide and 575 ppm of ammonia at a space velocity of 13,700 hr$^{-1}$ and at 350° C. The conversion rate of ammonia is 95.4 % and the conversion rate of nitrogen oxide is 98.0%, i.e., the non-conversion rate of nitrogen dioxide is 2.0%.

EXAMPLES 28 to 29

In the same manner as in Example 27, a gas mixture containing only nitrogen dioxide as the nitrogen oxides component is treated by using the catalysts having the component: V$_9$Cr$_3$O$_{27}$ as used in Example 1 or V$_9$Fe$_3$O$_{27}$ as used in Example 5. The results are shown in Table 4.

Onto the catalyst thus obtained in the similar manner as in Example 1 is passed through a gas mixture containing 84.7% by mol of nitrogen, 2.8% by mol of oxygen, 12.4% by mol of steam, 660 ppm of nitrogen monoxide and 784 ppm of ammonia at a space velocity of 13,700 hr$^{-1}$ and at 350° C. The conversion rate of ammonia is 84.4% and the conversion rate of nitrogen oxide is 97.6%, i.e., the non-conversion rate of nitrogen monoxide is 2.4%.

REFERENCE EXAMPLE 1

Onto the catalyst having the atomic ratio of vanadium and oxygen: V$_{12}$O$_{30}$, which is prepared in the similar manner as described in Example 1 by using the same starting vanadium compound as in Example 1, is passed through a gas mixture comprising 85.6% by mol of nitrogen, 2.6% by mol of oxygen, 11.7% by mol of steam, 320 ppm of nitrogen monoxide and 477 ppm of ammonia at a space velocity of 13,600 hr$^{-1}$ and at 300° C. The conversion rate of ammonia is 85.2% and the Table 4

| Ex. No. | Component of catalyst | Component of gas mixture | | | | | | | Space velocity hr$^{-1}$ | Reaction temperature °C | conversion rate of ammonia % | Conversion rate of nitrogen oxides % | Non-conversion rate of nitrogen monoxide % | Non-conversion rate of nitrogen dioxide % |
|---|---|---|---|---|---|---|---|---|---|---|---|---|---|---|
| | | N$_2$ % | O$_2$ % | H$_2$O % | NO ppm | NO$_2$ ppm | Total nitrogen oxides ppm | NH$_3$ ppm | | | | | | |
| 28 | V$_9$Cr$_3$O$_{27}$ | 85.4 | 2.6 | 12.0 | 0 | 209 | 209 | 288 | 13,600 | 250 | 64.2 | 97.8 | 0.5 | 1.7 |
| | | | | | | | | | | 300 | 82.2 | 99.5 | 0.5 | 0 |
| | | | | | | | | | | 350 | 100 | 94.0 | 3.3 | 2.7 |
| 29 | V$_9$Fe$_3$O$_{27}$ | 86.0 | 2.6 | 11.3 | 0 | 211 | 211 | 292 | 13,500 | 350 | 72.4 | 94.0 | 2.8 | 3.2 |

EXAMPLE 30

Onto the catalyst having the component: V$_9$Sn$_3$O$_{28.5}$ as used in Example 9 is passed through a gas mixture containing sulfur dioxide, i.e., comprising 85.6% by mol of nitrogen, 2.6% by mol of oxygen, 11.8% by mol of steam, 590 ppm of sulfur dioxide, 463 ppm of nitrogen monoxide and 711 ppm of ammonia at a space velocity of 13,600 hr$^{-1}$ and at 350° C. The conversion rate of ammonia is 100% and the conversion rate of nitrogen oxide is 98.9%, i.e. the non-conversion rate of nitrogen monoxide is 1.1%, which means that the activity of the present catalyst is not affected by the presence of sulfur dioxide.

EXAMPLE 31

A catalyst having the component: V$_9$Cr$_3$O$_{27}$ is prepared in a similar manner as in Example 1 by using α-alumina having a specific surface area of 5.0 m$^2$/g and a micropore volume of 0.41 cm$^3$/g instead of activated alumina.

conversion rate of nitrogen oxide is 86.3%, i.e., the non-conversion rate of nitrogen monoxide is 13.7%.

REFERENCE EXAMPLE 2

Onto the catalyst having the atomic ratio of iron, chromium and oxygen: Fe$_{10}$Cr$_2$O$_{18}$, which is prepared by using a solution of ferric nitrate in water and a solution of chromic anhydride in water and carrying out the calcination at 400° C for 5 hours, is passed through a gas mixture comprising 85.8% by mol of nitrogen, 2.6% by mol of oxygen, 11.5% by mol of steam, 349 ppm of nitrogen monoxide and 429 ppm of ammonia at a space velocity of 13,600 hr$^{-1}$ and at 300° C. The conversion rate of ammonia is 100% and the conversion rate of nitrogen oxide is 78.5%, i.e., the non-conversion rate of nitrogen monoxide is 21.5%.

REFERENCE EXAMPLES 3 TO 17

In a similar manner as described in Examples 1 to 16 and Reference Examples 1 to 2, a gas mixture is treated by using various catalysts, which are prepared in a similar manner as in the foregoing Examples. The results are shown in Table 5.

Table 5

| Ref. Ex. No. | Component of catalyst | Components of gas mixture | | | | | | | Space velocity nr⁻¹ | Reaction temperature °C | Conversion rate of ammonia % | Conversion rate of nitrogen oxides % | Non-conversion rate of nitrogen monoxide % | Non-conversion rate of nitrogen dioxide % |
|---|---|---|---|---|---|---|---|---|---|---|---|---|---|---|
| | | $N_2$ % | $O_2$ % | $H_2O$ % | NO ppm | $NO_2$ ppm | Total nitrogen oxides ppm | $NH_3$ ppm | | | | | | |
| 3 | $Cu_{5.3}Cr_{6.7}O_{15.4}$ | 86.4 | 2.6 | 10.8 | 940 | 0 | 940 | 1,754 | 13,500 | 225 | 99.1 | 83.5 | 16.5 | 0 |
| 4 | $Cr_{12}O_{18}$ | 85.8 | 2.6 | 11.5 | 345 | 0 | 345 | 516 | 13,600 | 250 | 99.4 | 80.9 | 19.1 | 0 |
| 5 | $Cu_{12}O_{12}$ | 86.5 | 2.5 | 10.8 | 364 | 0 | 364 | 385 | 13,500 | 300 | 90.0 | 53.0 | 47.0 | 0 |
| 6 | $Fe_{12}O_{18}$ | 85.8 | 2.6 | 11.5 | 345 | 0 | 345 | 516 | 13,600 | 300 | 92.2 | 61.7 | 38.3 | 0 |
| 7 | $Sn_{12}O_{24}$ | 86.3 | 2.6 | 11.0 | 433 | 0 | 433 | 510 | 13,500 | 300 | 24.5 | 30.7 | 69.3 | 0 |
| 8 | $Ni_{12}O_{12}$ | 86.5 | 2.6 | 10.8 | 459 | 0 | 459 | 505 | 13,500 | 400 | 55.8 | 53.1 | 46.9 | 0 |
| 9 | $Co_{12}O_{12}$ | 86.5 | 2.6 | 10.8 | 459 | 0 | 459 | 505 | 13,500 | 350 | 100 | 35.2 | 64.8 | 0 |
| 10 | $Pb_{12}O_{12}$ | 86.3 | 2.6 | 11.0 | 433 | 0 | 433 | 510 | 13,500 | 300 | 10.8 | 19.0 | 81.0 | 0 |
| 11 | $V_9Mn_3O_{25.5}$ | 85.6 | 2.6 | 11.7 | 307 | 0 | 307 | 629 | 13,600 | 400 | 73.8 | 73.5 | 26.5 | 0 |
| 12 | $V_9Ca_3O_{25.5}$ | 85.8 | 2.6 | 11.6 | 361 | 0 | 361 | 661 | 13,600 | 400 | 64.3 | 74.8 | 25.2 | 0 |
| 13 | $V_9Na_3O_{24}$ | 85.8 | 2.6 | 11.5 | 346 | 0 | 346 | 472 | 13,600 | 350 | 58.1 | 51.8 | 48.2 | 0 |
| 14 | $V_9K_3O_{24}$ | 85.8 | 2.6 | 11.5 | 346 | 0 | 346 | 472 | 13,600 | 350 | 46.9 | 51.8 | 48.2 | 0 |
| 15 | $V_9Ag_3O_{24}$ | 86.5 | 2.6 | 10.8 | 374 | 0 | 374 | 510 | 13,500 | 300 | 98.3 | 82.2 | 17.8 | 0 |
| 16 | $V_9Bi_3O_{27}$ | 85.8 | 2.6 | 11.6 | 361 | 0 | 361 | 661 | 13,600 | 400 | 67.0 | 87.3 | 12.7 | 0 |
| 17 | $V_9Sb_3O_{28.5}$ | 85.8 | 2.6 | 11.5 | 345 | 0 | 345 | 516 | 13,600 | 300 | 98.3 | 83.6 | 16.4 | 0 |

What is claimed is:

1. A process for the selective removal of nitrogen oxides from waste gases containing nitrogen oxides, which comprises contacting the waste gases with ammonia in the presence of a metal oxide catalyst for the reduction of nitrogen oxides with ammonia, said catalyst consisting essentially of a composition having the following formula $$V_xA_yO_z$$

wherein V is vanadium; A is at least one element selected from the group consisting of copper, zinc, tin, lead, titanium, phosphorus, chromium, iron, cobalt and nickel; x and y are each a numeral of 0.5 to 12; and z is determined by the valence requirements of the other elements in said compound.

2. The process according to claim 1, wherein A is one or more of copper, tin, chromium and iron.

3. The process according to claim 1, wherein the ratio of x and y is in the range of 11 : 1 to 3 : 9.

4. The process according to claim 1, wherein the ammonia is added in an amount of 0.3 to 4 mol to 1 mol of the nitrogen oxides.

5. The process according to claim 3, wherein the amount of ammonia is in the range of 0.7 to 3 mol to 1 mol of the nitrogen oxides.

6. The process according to claim 1, wherein the contact of the waste gases with the metal oxide catalyst is carried out at a temperature of 150° to 800° C.

7. The process according to claim 5, wherein the temperature is in the range of 200° to 400° C.

8. The process according to claim 1, wherein the waste gases are contacted with the metal oxide catalyst at a space velocity of 2,000 to 100,000 hr⁻¹.

9. The process according to claim 7, wherein the space velocity is in the range of 6,000 to 30,000 hr⁻¹.

10. The process according to claim 1, wherein z is 1 to 60.

11. The process according to claim 1, wherein V and A are present in the form of oxides or complex oxides in said metal oxide catalyst, said vanadium being penta-, tetra-, or trivalent, said copper being di- or monovalent, said zinc being divalent, said tin or lead being tetra- or divalent, said titanium being tetravalent, said phosphorus being pentavalent, said chromium being hexa-, penta- or trivalent, and said iron, cobalt or nickel being tri- or divalent.

12. The process according to claim 1, wherein the metal oxide catalyst is prepared by mixing a solution of ammonium metavanadate in water containing monoethanolamine with a solution of a nitrate of copper, zinc, lead, iron, cobalt or nickel; chromic anhydride; titanium tetrachloride; or phosphoric acid in water so as to give a fixed atomic ratio of each metal, penetrating the resulting mixture into an activated alumina having a tablet or granule form, drying the penetrated product at a temperature of 60° to 250° C. until it becomes substantially anhydrous, and then calcining the resultant product at a temperature of 300° to 800° C.

13. A method for the removal of nitrogen oxides from effluent gas which comprises reducing the nitrogen oxides contained within said effluent gas with ammonia in the presence of a catalyst consisting essentially of tin oxide and vanadium oxide in an amount of 20–96 mole percent $SnO_2$ and 4–80 mole percent $V_2O_5$ at a temperature of 250° to 450° C.

* * * * *

UNITED STATES PATENT AND TRADEMARK OFFICE
CERTIFICATE OF CORRECTION

PATENT NO. : 4,010,238
DATED : March 1, 1977
INVENTOR(S) : Tatsuo SHIRAISHI et al It is certified that error appears in the above–identified patent and that said Letters Patent are hereby corrected as shown below:

IN THE HEADING OF THE PATENT:

Under "[30] Foreign Application Priority Data" change "48-34895" to -- 48-34845 --.

Signed and Sealed this fifth Day of July 1977

[SEAL]

Attest:

RUTH C. MASON
*Attesting Officer*

C. MARSHALL DANN
*Commissioner of Patents and Trademarks*